(12) United States Patent
Anderberg

(10) Patent No.: US 8,645,004 B2
(45) Date of Patent: Feb. 4, 2014

(54) METHOD FOR AUTOMATED DOCKING OF A PASSENGER BRIDGE OR A GOODS HANDLING BRIDGE TO A DOOR OF AN AIRCRAFT

(75) Inventor: Nils-Erik Anderberg, Trelleborg (SE)

(73) Assignee: FMT International Trade AB, Trelleborg (SE)

( * ) Notice: Subject to any disclaimer, the term of this patent is extended or adjusted under 35 U.S.C. 154(b) by 1041 days.

(21) Appl. No.: 12/089,206

(22) PCT Filed: Sep. 28, 2006

(86) PCT No.: PCT/SE2006/050359
§ 371 (c)(1),
(2), (4) Date: Jul. 31, 2008

(87) PCT Pub. No.: WO2007/040448
PCT Pub. Date: Apr. 12, 2007

(65) Prior Publication Data
US 2009/0217468 A1    Sep. 3, 2009

(30) Foreign Application Priority Data

Oct. 4, 2005    (SE) ...................................... 0502178

(51) Int. Cl.
*G01C 23/00*    (2006.01)
*G05D 1/00*    (2006.01)
*G05D 3/00*    (2006.01)
*G06F 7/00*    (2006.01)
*G06F 17/00*    (2006.01)

(52) U.S. Cl.
USPC ................ 701/3; 340/945; 340/958; 342/23; 348/143; 14/71.5

(58) Field of Classification Search
USPC ......... 14/71.5, 69.5, 71.1, 71.3, 71.7; 700/13; 340/945, 947, 958, 972; 356/4.01; 244/114 R; 701/3, 120, 121; 342/23; 348/143

See application file for complete search history.

(56) References Cited

U.S. PATENT DOCUMENTS

| 5,226,204 | A | * | 7/1993 | Schoenberger et al. | ........ 14/71.5 |
|---|---|---|---|---|---|
| 6,100,964 | A | | 8/2000 | De Cremiers | |
| 6,324,489 | B1 | * | 11/2001 | Millgård | ........................ 702/151 |
| 7,093,314 | B2 | * | 8/2006 | Hutton et al. | ................... 14/71.5 |
| 2002/0030609 | A1 | * | 3/2002 | Baumgartner et al. | ........ 340/958 |
| 2003/0160710 | A1 | * | 8/2003 | Baumgartner et al. | ........ 340/958 |
| 2003/0208860 | A1 | * | 11/2003 | Hutton et al. | ................... 14/71.5 |
| 2003/0208861 | A1 | * | 11/2003 | Hutton et al. | ................... 14/71.5 |

(Continued)

FOREIGN PATENT DOCUMENTS

| WO | 96/08411 A1 | 3/1996 |
|---|---|---|
| WO | 96/09207 A1 | 3/1996 |

(Continued)

*Primary Examiner* — Rami Khatib
(74) *Attorney, Agent, or Firm* — Young & Thompson

(57) ABSTRACT

Method for automatically docking a passenger bridge (1, 2) to an airplane (5) door (3, 4) at an airport gate, wherein the airplane is brought to and stopped in a predetermined position by contact less measurement of the distance between the airplane and a fixed point and wherein a control computer (14) is adopted to control the movement of the passenger bridge and wherein a start signal (24) is required from a person after the person has established the correct type of airplane and version of the airplane type to enable the control computer to cause the passenger bridge to be moved for docking.

14 Claims, 3 Drawing Sheets

(56) References Cited

U.S. PATENT DOCUMENTS

Figure 1:
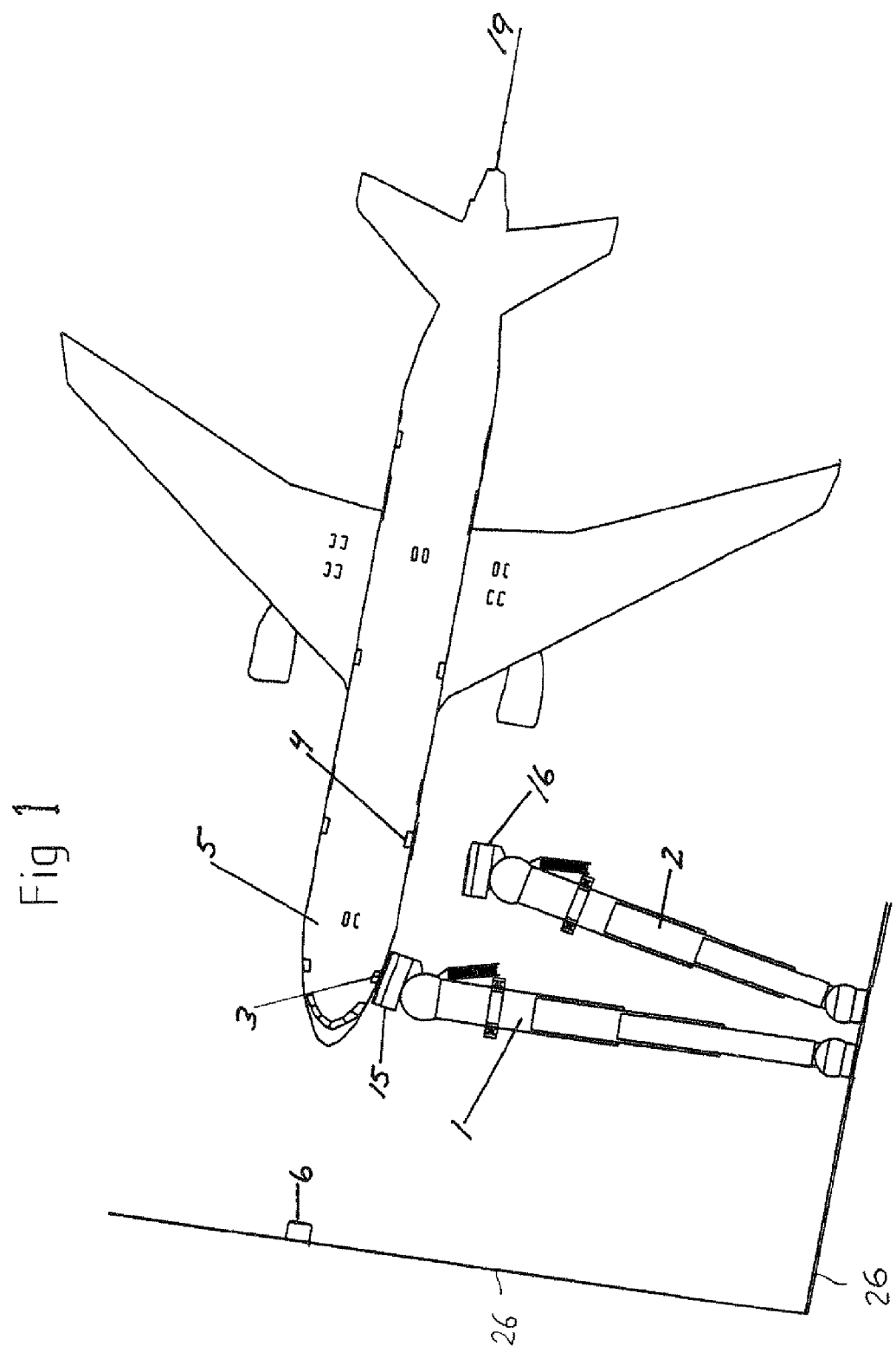

| | | | |
|---|---|---|---|
| 2004/0019984 A1* | 2/2004 | Hutton | 14/71.5 |
| 2004/0187234 A1* | 9/2004 | Hutton et al. | 14/71.5 |
| 2004/0237224 A1* | 12/2004 | Hutton | 14/71.5 |
| 2007/0210952 A1* | 9/2007 | Hutton | 342/23 |
| 2007/0219710 A1* | 9/2007 | Hutton | 701/207 |

FOREIGN PATENT DOCUMENTS

| | | |
|---|---|---|
| WO | 01/35327 A1 | 5/2001 |
| WO | 03/072435 A1 | 9/2003 |
| WO | 2004/085250 A1 | 10/2004 |

* cited by examiner

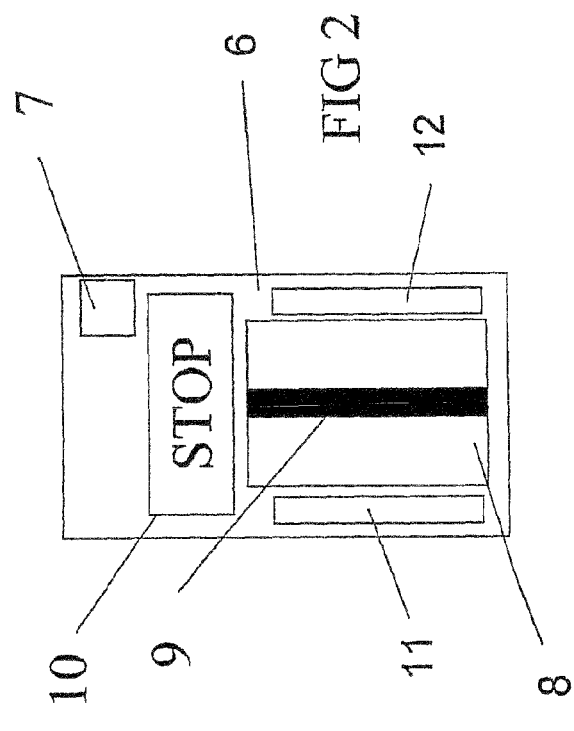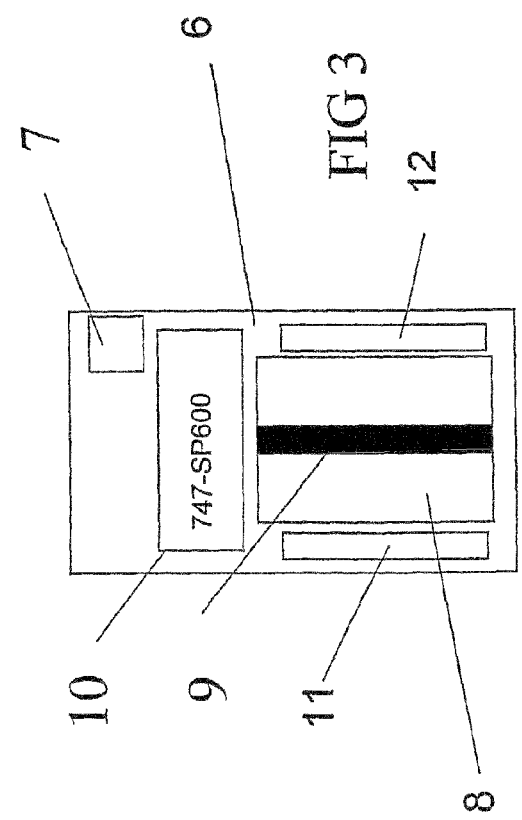

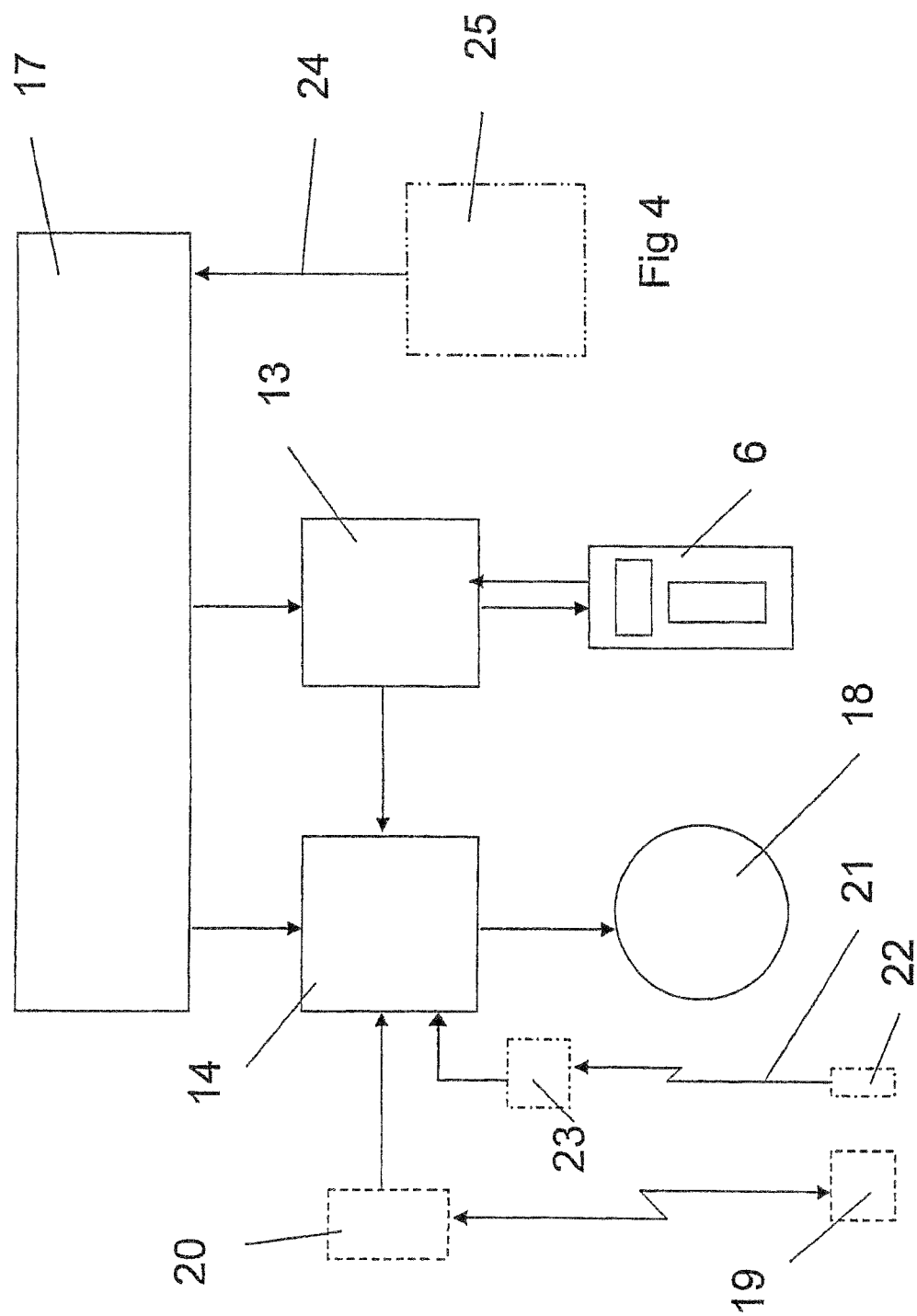

METHOD FOR AUTOMATED DOCKING OF A PASSENGER BRIDGE OR A GOODS HANDLING BRIDGE TO A DOOR OF AN AIRCRAFT

BACKGROUND OF THE INVENTION

1. Field of the Invention

The present invention relates to a method of docking an air passenger bridge or a goods handling bridge to an airplane door automatically in the absence of the influence of a driver.

2. Description of the Related Art

In present days many airports include passenger bridges or walkways which are connected to an airplane from a terminal building and along which passengers pass to and from an airplane. Several different types of passenger bridges are known in the art, of which one type of bridge is a so-called mobile telescopic bridge (MTB) which comprises a number of telescopic components where the outmost component is supported by a bogie that includes separately driven wheels. The passenger bridge is manoeuvred by means of this bogie on the airplane hard standing towards and away from an airplane. At the point of connection of the bridge with a terminal building there is provided a rotunda which can be rotated about a vertical axis and which is supported by a ground-anchored pillar. A cabin which is rotatable relative to the outmost telescopic element of the passenger bridge is provided on the outmost part of said bridge. The cabin is that part of the bridge adapted for connection to a door of an airplane.

A serious problem with existing solutions is the relatively long time it takes to embark passengers on the airplane and also in evacuating passengers from the airplane when the airplane is parked at a so-called gate. This means that the time taken from the moment an airplane has landed to the moment at which it can again be started is unnecessarily long, which is uneconomical at the same time as the passengers are of the opinion that they are forced to wait unnecessarily.

It is known that docking of an airplane to a passenger bridge uses contact less measurement of the distance to the incoming airplane. It is also known to indicate to the pilot the position of the airplane relative to the centre line along which the airplane shall move towards a stopping point at which the cabin shall be docked with the airplane door. This distance measurement is used to indicate the stopping point to the pilot. The stopping point is individual to different airplanes and thus lies at different distances from the distance meter used. It is presumed that such a docking system is aware of the type of airplane to be docked and therewith the distance between the distance meter and a specific part of the airplane.

The technique most used at presence for measuring the distance and in certain instances also the position of the airplane relative to this centre line involves the use of distance determining or range finding lasers.

The airplane is thus now led relatively quickly into its stopping point.

There then follows a time consuming period during which the passengers wait in the plane, namely the time taken to dock the cabin with the airplane door. To this end it is necessary at present for an attendant at the airport terminal to walk along the passenger bridge to the cabin and, with the aid of an operating lever, move the passenger bridge out towards the airplane to a position in which the leading edge of the cabin is in abutment with the airplane at the location of a door. Experience has shown that this operation can take up to five minutes from the time at which the airplane has been positioned at its stopping point.

Swedish Patent specification 503 396 describes a method of automatically connecting a passenger bridge to an airplane. The invention according to this patent specification 503 396 greatly reduces the time taken to connect the cabin. However, when this connection shall take place fully automatically and result in a correct connection it is necessary to check the type of airplane concerned and the version of said type, by effecting measurements on the airplane or in response to an all-clear signal given by an airline representative that docking may take place.

Data entered into an all-inclusive data system concerning the type and version of the airplane concerned is normally considered to be correct. However, experience has shown that such data in an all-inclusive data system, for instance in the data system FIDS (Flight Information and Destination System) and/or in a local data system, for instance GOS (Gate Operating System), used for allocating a gate to incoming airplane, is not always correct.

SUMMARY OF THE INVENTION

The present invention solves the problem with regard to this time consuming docking procedure and greatly enhances the safety factor in respect of the automatic docking of a passenger bridge to an airplane. As a result, the time taken to dock the cabin of the passenger bridge correctly to the door of an airplane is greatly reduced.

The present invention thus relates to a method of automatically docking a passenger bridge or a goods handling bridge to a door of an airplane at an airport gate, where the airplane is positioned and stopped in a predetermined position by contact less measurement of the distance between the airplane and a fixed point, where the distance is indicated on a display mounted in front of the pilot of the airplane on, for instance, an airport structure, wherewith the display is caused to present to the pilot the position of the airplane relative to an airplane stopping point, and to show the type of airplane concerned, wherein said distance measuring proc-ess and said displaying process are caused to be activated by an all-inclusive data system belonging to the airport, and wherein a control computer is provided for controlling move-ments of the passenger bridge, and wherein the invention is characterized in that when a distance meter for carrying out said distance measuring process and said display have been activated for positioning an incoming airplane, there is re-quired a start signal given by a responsible person after both the correct type of airplane and the correct version of said airplane type have been established in order for said control computer to be able to cause the passenger bridge to move for docking with an airplane, provided that the airplane has stopped within a given predetermined position range, the distance measuring device is caused to send a signal to said control computer which has access to the positions of the doors on different types of airplane and different versions of said airplane types, so as to control movement of the pas-senger bridge to a position in which the cabin on the bridge connects with a door of the airplane, in the absence of any influence from a driver.

BRIEF DESCRIPTION OF THE DRAWING FIGURES

The invention will now be described in more detail partly with reference to the accompanying drawings, in which FIG. 1 is a schematic plan view of an airplane and two passenger bridges;

FIGS. 2 and 3 illustrate a display which is intended to present information to a pilot in a docking airplane; and FIG. 4 is a block diagram.

DETAILED DESCRIPTION OF THE INVENTION

The present invention relates to a method of automatically docking a passenger bridge 1, 2 or a goods handling bridge to a door 3, 4 of an airplane 5 at an airport gate. The airplane is positioned and stopped in a pre-determined position with the aid of known contact less measurement of the distance between the airplane and a fixed point, this distance being indicated on a display 6 mounted in front of the pilot of the airplane, for instance on an airport structure 26. The dis-play 6 is caused to show to the pilot the position of the airplane 5 relative to an airplane stopping point and to pre-sent to the pilot the type of airplane concerned. A distance meter 13 and said display 6 are caused to be activated by an all-inclusive data system belonging to the airport, in an earlier known manner. There is also provided a control computer which is adapted to control movements of the passenger bridge.

The distance is usually measured with the aid of an IR-laser system. The laser is placed in connection with the display 6 and is adapted to send measuring pulses stepwise at different angles in the horizontal and the vertical planes so as to thereby detect a pre-determined measurement volume. This distribution of pulses is achieved by providing the laser with a moveable mirror onto which laser pulses are directed.

Known airplane measuring systems that utilize such laser techniques include software by means of which it is possible to establish that measurements are taken on an incoming airplane.

Measurements are taken at different height zones above the ground, when an airplane is expected to arrive. The laser beams are thus not directed so as to strike the ground, but are expected to be reflected by an airplane. When such beams are reflected, it is considered that an airplane has been detected.

In this regard it can be ascertained that different nearby distances are obtained in respect of laser pulses transmitted at nearby angles, said differences in distance corresponding to the shape of the forward part of the airplane body.

However, the contact less measurement of distances can also be caused to measure the position of the airplane in relation to said centre line. This can be achieved by adapting the scanning laser for scanning both vertically and horizontally, i.e. in two dimensions. Because the distance to the front part of the airplane is not symmetrical with respect to the centre line it is possible, in this way, to detect on which side of the centre line the airplane is displaced.

The distance meter (13) may include another arrangement for transmitting and receiving electromagnetic pulses, such as a microwave system, directed towards a region or area along a centre line along which an airplane is intended to be positioned and located in front of an airplane being positioned.

FIG. 2 illustrates schematically a known display unit 6. The laser is marked in FIG. 2 with a window 7 through which laser beams or rays are sent and received. Reference No. 8 identifies a bearing indicator according to Swedish Patent specification 8105509-7, which is based on so-called moaré technology. When the airplane is located on the centre line, 30 the pilot will see a vertical black dash 9 on the bearing indicator 8. Such known displays 6 also include a text field 10 in which, among other things, the type of airplane expected to arrive at the gate concerned is given. Moreover, such displays 6 include illuminated columns 11, 12 or lights which indicate to the pilot the speed at which he is approaching the stopping point in an analogous manner.

Such distance meters and displays are most often connected to an airport-based central all-inclusive data system, in which there is stored, among other things, information relating to the type of airplane concerned and where the airplane shall be positioned.

As illustrated in FIG. 2, when an airplane reaches its stopping point, this is indicated in the text field 10 by the word "STOP".

According to the present invention a start signal 24 is required to be given by a person subsequent to the right type of airplane and the version of the airplane type having been established, after the distance meter 13 and the display 6 have been activated for positioning of an incoming airplane, in order for the control computer 14 to be able to cause the passenger bridge 1; 2 to move for docking with an airplane 5.

Provided that the airplane has stopped within a given pre-determined positioning range, the distance meter 13 is caused to emit a signal to the control computer 14, which has access to the positions of the doors on different types of airplane and different versions of these types, so as to control movement of the passenger bridge 1; 2 to a position in which the cabin 15; 16 of the bridge will be connected to an airplane door 3; 4, in the absence of the influence of a driver.

Docking of the passenger bridge is thus effected in the absence of a driver, by which is meant that no person, i.e. driver, is present in the cabin of the passenger bridge.

According to a first preferred embodiment of the invention the start signal 24 is caused to be given from a control unit 25 by a person monitoring the various gates subsequent to the person having received an all-clear indication with regard to the type of airplane concerned and the version of the airplane type. The all-clear signal with regard to the type and version of the airplane may, for instance, be obtained from the crew of the airplane. Such an all-clear signal may, for instance, be given orally over the radio by the captain of the airplane. The person may be a person seated in the airport ground control system. According to one embodiment, the person may have access to monitors connected to cameras (not shown) placed at respective gates for the purpose of monitoring or supervising bridge docking operations. This comprises significant rationalization of personnel and time in comparison with manual monitoring of respective bridges.

According to second preferred embodiment of the invention, the start signal 21 is sent by the pilot to a receiver 23 with the aid of a transmitter 22. The transmitter 22 is adapted to transmit radio waves or, alternatively, infrared light to the receiver 23. The receiver 23 is suitably placed in connection with the passenger bridge or said display. The receiver sends a start signal to the control computer 14 or to the all-inclusive data system 17.

According to a third preferred embodiment of the invention, the display 6 is caused to show to the pilot the version of the type of airplane concerned in addition to the type of airplane, after the activation of the distance meter 13 and the display 6 for positioning of an incoming airplane. When the pilot accepts the type of airplane and the version of the airplane type shown on the display, the pilot is caused to move the airplane forwards to the stopping point, wherewith movement of the airplane forwards towards said stopping point constitutes said start signal.

When the pilot accepts the type of airplane and the version of the type of airplane presented on the display 6, the pilot will then as mentioned move the airplane forwards to the stopping point indicated on the display 6, where the airplane is then stopped. Should the pilot see that the type of airplane and/or the version of the airplane type shown on the display 6 is/are incorrect, the pilot will stop the airplane immediately and report the error, for instance, to the airport ground control personnel.

This is illustrated in FIG. 3 by the text message 747-SP600 presented in the display 6. The digits 747 identify a Boeing 747 type airplane, while the reference SP600 identifies the version of the Boeing 747 intended. The position of the doors on the body of the airplane will vary in dependence of the version of the airplane, as will also the position of the wings in certain cases.

According to a preferred embodiment of the invention information relating to the awaited type of airplane and the version of said airplane type is fetched from the all-inclusive data system 17 for activation of the distance meter and the display.

According to one preferred alternative embodiment of the invention information concerning the type and the version of the incoming airplane is caused to be read for activating said distance meter 13 and said display 6 from a transponder 19 situated in or on the airplane 5, with the aid of a reader 20 placed in connection with the display 6. This information may consist in the airplane identification number. This number may be linked to the type of airplane and the version of said airplane type in the data base of the all-inclusive data system 17. The transponder 19 may be of a very simple kind, for example a so-called passive transponder that only reflects and modulates a query signal from the reader with said information. Such a transponder may be placed, for instance, on the inside of the windscreen of the cockpit or inwardly of the nose cone of the airplane.

Provided that a start signal has been given and provided that the airplane has stopped within a given pre-determined position interval, the distance meter 13 is caused to send a signal to the control computer 14, which has access to the positions of the doors of different types of airplane and different versions of airplane types, for controlling movement of the passenger bridge 1, 2 to a position in which the cabin 15; 16 of the passenger bridge connects with the airplane door 3; 4 concerned.

This access to the positions of the airplane doors on different airplane types and versions of airplane types can be stored in a memory belonging to the control computer 14 or may be fetched by the control computer 14 from a data base belonging to the all-inclusive data system 17.

The passenger bridge 1; 2 concerned is moved to a position in which the cabin 15; 16 of the passenger bridge connects with the door 3; 4 concerned of the airplane 5 with the aid of motors 18 in a known manner.

The pre-determined area is the area within which the cabin 16, 17 of the passenger bridge 1; 2 can be moved to a position at which the chosen door of the airplane 5 has stopped.

Thus checks are made that the parking system including the distance meter and the display is set to the correct type of airplane and also to the correct version of the airplane type prior to parking of the airplane being completed, and is verified in this regard with said start signal. This eliminates the risk of the airplane colliding with the passenger bridge as a result of the parking system for instance being set for the wrong version of the airplane type, or at least greatly limits this risk.

Moreover, correct data concerning the type and the version of the airplane ensures that the passenger bridge or bridges is/are are moved correctly to the right door/doors.

Although the invention has been described above with reference to a number of embodiments thereof it will be understood that the invention can be modified with respect to the structure of the computer systems and the design of the display, etc., without departing from the basic concept of the invention, namely that a person is able to assure himself that both the airplane type and the version of the airplane are correct prior to terminating the parking procedure.

Consequently, the present invention shall not be considered as being limited to the embodiments described above, since variations and modifications can be made to these embodiments within the scope of the accompanying claims.

The invention claimed is:

1. A method of automatically docking a passenger bridge or a goods handling bridge to a door of an airplane at an airport gate, comprising:
   bringing the airplane (5) to a pre-determined position and stopped in said position by contactless measuring of a distance between the airplane and a fixed point;
   indicating the distance on a display (6) mounted in front of a pilot of the airplane or on an airport structure (26);
   causing the display (6) to show to the pilot the position of the airplane (5) relative to the airplane pre-determined position, and to show a type and a version of the type of airplane concerned;
   activating said distance measuring and display functions by an airport installed data system (17); and
   controlling movements of the passenger bridge with a control computer (14),
   wherein subsequent to activation of a distance meter (13) for measuring said distance and of the display (6) for positioning an arriving airplane there is received from a person, a start signal (24),
   said start signal received subsequent to having established that the correct type of airplane and the correct version of the airplane type has been set to enable the control computer (14) to cause the passenger bridge (1;2) to be moved for docking with the airplane (5), provided that the airplane has stopped within a given pre-determined position interval, and
   the distance meter (13) sends a signal to said control computer (14), which has access to data relating to the positions of the airplane doors on different airplane types and versions of airplane types, to guide movement of the passenger bridge (1;2) to a position in which the cabin (15; 16) of the passenger bridge connects with the door (3; 4) of the airplane (5) in the absence of the influence of a driver.

2. The method according to claim 1, wherein said start signal (24) is sent from a control unit (25) received from a person who superintends the various airport gates, subsequent to the person having received an all-clear signal regarding the type of airplane concerned and the version of airplane type.

3. The method according to claim 2, wherein the start signal (21) sent by the pilot with the aid of a transmitter (22).

4. The method according to claim 2, wherein the display (6) shows the version of the type of airplane in addition to the airplane type to the pilot subsequent to activation of the distance meter (13) for measuring said distance and the display (6) for positioning of an incoming airplane, and in that when the pilot accepts the displayed type of airplane and the version of said airplane type, the pilot causes the airplane to move forwards to the pre-determined position, wherein movement of the airplane to said pre-determined position constitutes said start signal (24).

5. The method according to claim 1, wherein the start signal (21) is sent by the pilot with the aid of a transmitter (22).

6. The method according to claim 5, wherein the transmitter (22) is adapted to send one of radio waves and infrared light to a receiver (23) located in connection with one of the passenger bridge (1; 2) and said display (6).

7. The method according to claim 6, wherein the display (6) shows the version of the type of airplane in addition to the airplane type to the pilot subsequent to activation of the distance meter (13) for measuring said distance and the display (6) for positioning of an incoming airplane, and in that when the pilot accepts the displayed type of airplane and the version of said airplane type, the pilot causes the airplane to move forwards to the pre-determined position, wherein movement of the airplane to said pre-determined position constitutes said start signal (24).

8. The method according to claim 5, wherein the display (6) shows the version of the type of airplane in addition to the airplane type to the pilot subsequent to activation of the distance meter (13) for measuring said distance and the display (6) for positioning of an incoming airplane, and in that when the pilot accepts the displayed type of airplane and the version of said airplane type, the pilot causes the airplane to move forwards to the pre-determined position, wherein movement of the airplane to said pre-determined position constitutes said start signal (24).

9. The method according to claim 1, wherein the display (6) shows the version of the type of airplane in addition to the airplane type to the pilot subsequent to activation of the distance meter (13) for measuring said distance and the display (6) for positioning of an incoming airplane, and when the pilot accepts the displayed type of airplane and the version of said airplane type, the pilot causes the airplane to move forwards to the pre-determined position, wherein movement of the airplane to said pre-determined position constitutes said start signal (24).

10. The method according to claim 9, wherein information relating to an expected airplane type and version of said airplane type for activating said distance meter (13) and said display is taken from said data system (17).

11. The method according to claim 10, wherein information relating to an incoming airplane type and version of said airplane type for activating the distance meter (13) and the display (6) is read from a transponder (19) located in or on the airplane, with the aid of a reader (20) placed in connection with the display (6).

12. The method according to claim 9, wherein information relating to an incoming airplane type and version of said airplane type for activating the distance meter (13) and the display (6) is read from a transponder (19) located in one of in the airplane and on the airplane, with the aid of a reader (20) placed in connection with the display (6).

13. The method according to claim 1, wherein the distance meter (13) includes a device for sending and receiving electromagnetic pulses comprising one of a scanning laser (2) and a microwave system directed towards an area along a centre line (19) along which an airplane (5) is intended to move in an airplane positioning process and located in a position in front of a positioned airplane.

14. The method according to claim 1, wherein upon determining that one of type of airplane and version of the airplane type are incorrect, stopping the airplane at its current location.

* * * * *

UNITED STATES PATENT AND TRADEMARK OFFICE
CERTIFICATE OF CORRECTION

PATENT NO. : 8,645,004 B2 Page 1 of 1
APPLICATION NO. : 12/089206
DATED : February 4, 2014
INVENTOR(S) : Nils-Erik Anderberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1283 days.

Signed and Sealed this

Twenty-ninth Day of September, 2015

Michelle K. Lee
*Director of the United States Patent and Trademark Office*